(12) United States Patent
Vasseur et al.

(10) Patent No.: US 7,496,105 B2
(45) Date of Patent: Feb. 24, 2009

(54) SYSTEM AND METHOD FOR RETRIEVING COMPUTED PATHS FROM A PATH COMPUTATION ELEMENT USING ENCRYPTED OBJECTS

(75) Inventors: Jean-Philippe Vasseur, Dunstable, MA (US); Richard Bradford, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 736 days.

(21) Appl. No.: 10/983,327

(22) Filed: Nov. 5, 2004

(65) Prior Publication Data

US 2006/0098587 A1 May 11, 2006

(51) Int. Cl.
*H04L 12/28* (2006.01)
(52) U.S. Cl. ............ 370/401; 370/248; 370/404; 709/238; 709/249
(58) Field of Classification Search ............... None
See application file for complete search history.

(56) References Cited

U.S. PATENT DOCUMENTS

| | | |
|---|---|---|
| 6,493,317 B1 | 12/2002 | Ma |
| 6,651,101 B1 | 11/2003 | Gai et al. |
| 6,665,273 B1 | 12/2003 | Goguen et al. |
| 6,721,272 B1 | 4/2004 | Parnafes et al. |
| 6,804,355 B1 | 10/2004 | Graunke |
| 7,136,357 B2 * | 11/2006 | Soumiya et al. ............ 370/236 |
| 2004/0093521 A1 * | 5/2004 | Hamadeh et al. ............ 713/201 |
| 2004/0208175 A1 * | 10/2004 | McCabe ............ 370/389 |
| 2006/0098657 A1 * | 5/2006 | Vasseur et al. ............ 370/392 |

OTHER PUBLICATIONS

U.S. Appl. No. filed Nov. 5, 2004 entitled System and Method for Selecting a Path Computation Element, Vasseur, et al.
U.S. Appl. No. filed Nov. 5, 2004 entitled System and Method for Retrieving Computed Paths From a Path Computation Element Using a Path Key, Vasseur, et al.
Federal Information Processing Standards Publication 46-2, entitled Data Encryption Standard (DES), published Dec. 30, 1993, pp. 1-16.
Rekhter, Y., RFC 1771, entitled A Border Gateway Protocol 4 (BGP-4), Mar. 1995, pp. 1-28.
Moy, J., RFC 2328, entitled OSPF Version 2, Apr. 1998, pp. 1-183.
Coltun, R., RFC 2370, entitled The OSPF Opaque LSA Option, Jul. 1998, pp. 1-13.

(Continued)

*Primary Examiner*—Duc C Ho
(74) *Attorney, Agent, or Firm*—Cesari and McKenna LLP (57) ABSTRACT

A technique retrieves computed path segments across one or more domains of a computer network in accordance with a stateless Path Computation Element (PCE) model. The stateless PCE model includes one or more PCEs configured to compute one or more path segments through the domains in response to a path computation request issued by, e.g., a Path Computation Client (PCC). Notably, each computed path segment is encrypted as a data structure to preserve confidentiality across the domains. Each PCE then cooperates to return a path computation response, including the encrypted path segments and an explicit route object (ERO) containing compressed path descriptions of the computed path segments, to the PCC.

8 Claims, 8 Drawing Sheets

OTHER PUBLICATIONS

Callon, R., RFC 1195, entitled Use Of OSI ISIS for routing in TCP/IP and Dual Environments, Dec. 1990, pp. 1-80.

Awduche, D. et al., RFC 3209, entitled RSVP-TE: Extensions to RSVP for LSP Tunnels Dec. 2001, pp. 1-43.

Smit, H., RFC 3784, entitled Intermediate-System-to-Intermediate-System (IS-IS) Extensions for Traffic Engineering (TE), Jun. 2004, pp. 1-13.

Katz, D. et al., RFC 3630, entitled Traffic Engineering (TE) Extensions to OSPF Version 2, Sep. 2003, pp. 1-14.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

Vasseur, J.P. et al., OSPF MPLS Traffic Engineering Capabilities(draft-vasseur-ospf-te-caps-00.txt), Internet Draft, Jul. 2004, pp. 1-14.

Vasseur, J.P. et al., RSVP Path Computation Request and Reply Messages (draft-vasseur-mpls-computation-rsvp-05.txt), Internet Draft, Jul. 2004, pp. 1-31.

Braden, R. et al., RFC 2205, entitled Resource ReSerVation Protocol (RSVP), Version 1 Functional Specification, Sep. 1997, pp. 1-112.

Vasseur, J.P. et al., IS-IS Traffic Engineering Capabilities (draft-vasseur-isis-te-caps-00.txt), Internet Draft, Jul. 2004, pp. 1-15.

Farrel, A. et al., entitled draft-ash-pce-architecture-00.txt Path Computation Element (PCE) Architecture, IETF Internet Draft, Sep. 2004, pp. 1-18.

Lindem, A et al., Extensions to OSPF for Advertising Optional Router Capabilities (draft-ietf-ospf-cap-03.txt), Internet Draft, Feb. 2005, pp. 1-8.

Rekhter, Y., RFC 1771, entitled A Border Gateway Protocol 4 (BGP-4), Mar. 1995, pp. 1-54.

* cited by examiner

FIG. 7 ns of the Transcription Control Protocol (TCP/IP). In this context, a protocol consists of a set of rules

SYSTEM AND METHOD FOR RETRIEVING COMPUTED PATHS FROM A PATH COMPUTATION ELEMENT USING ENCRYPTED OBJECTS

RELATED APPLICATION

This application is related to U.S. application Ser. No. 10/982,641, entitled SYSTEM AND METHOD FOR RETREIVING COMPUTED PATHS FROM A PATH COMPUTATION ELEMENT USING A PATH KEY, filed by Vasseur et al. on even date herewith, the contents of which are hereby incorporated in its entirety.

BACKGROUND OF THE INVENTION

1. Field of the Invention

The present invention relates to computer networks and, more particularly, to retrieving paths computed by path computation elements of a computer network.

2. Background Information

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Computer networks may be further interconnected by an intermediate node, such as a router, to extend the effective "size" of each network. Since management of a large system of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. It may also be desirable to interconnect various ASes that are operated under different administrative domains. As used herein, a router that connects different areas or ASes together is generally referred to as a border router. In the case of areas rather than ASes since the routers are under a common authority, a single router may in fact serve as an exit border router of one area and an entry border router of another area.

An example of an interdomain routing protocol is the Border Gateway Protocol version 4 (BGP), which performs routing between ASes by exchanging routing and reachability information among neighboring interdomain routers of the systems. An adjacency is a relationship formed between selected neighboring (peer) routers for the purpose of exchanging routing information messages and abstracting the network topology. BGP generally operates over a reliable transport protocol, such as the Transmission Control Protocol (TCP), to establish a TCP connection/session. The BGP protocol is well known and generally described in Request for Comments (RFC) 1771, entitled *A Border Gateway Protocol 4 (BGP-4)*, published March 1995, which is hereby incorporated by reference.

Examples of an intradomain routing protocol, or an interior gateway protocol (IGP), are the Open Shortest Path First (OSPF) routing protocol and the Intermediate-System-to-Intermediate-System (ISIS) routing protocol. The OSPF and ISIS protocols are based on link-state technology and, therefore, are commonly referred to as link-state routing protocols. Link-state protocols define the manner with which routing information and network-topology information are exchanged and processed in an AS or area. This information is generally directed to an intradomain router's local state (e.g., the router's usable interfaces and reachable neighbors or adjacencies). The OSPF protocol is described in RFC 2328, entitled OSPF Version 2, dated April 1998 and the ISIS protocol is described in RFC 1195, entitled *Use of OSI ISIS for routing in TCP/IP and Dual Environments*, dated December 1990, both of which are hereby incorporated by reference.

Multi-Protocol Label Switching (MPLS) Traffic Engineering has been developed to meet data networking requirements such as guaranteed available bandwidth or fast restoration. MPLS Traffic Engineering exploits modern label switching techniques to build guaranteed bandwidth end-to-end tunnels through an IP/MPLS network of label switched routers (LSRs). These tunnels are a type of label switched path (LSP) and thus are generally referred to as MPLS Traffic Engineering (TE) LSPs. Examples of MPLS TE can be found in RFC 3209, entitled *RSVP-TE: Extensions to RSVP for LSP Tunnels* dated December 2001, RFC 3784 entitled *Intermediate-System-to-Intermediate-System (IS-IS) Extensions for Traffic Engineering (TE)* dated June 2004, and RFC 3630, entitled *Traffic Engineering (TE) Extensions to OSPF Version 2* dated September 2003, the contents of all of which are hereby incorporated by reference in their entirety.

Establishment of an MPLS TE LSP from a head-end LSR to a tail-end LSR involves computation of a path through a network of LSRs. Optimally, the computed path is the "shortest" path, as measured in some metric, that satisfies all relevant LSP Traffic Engineering constraints such as e.g., required bandwidth, availability of backup bypass tunnels for each link and node included in the path, etc. Path computation can either be performed by the head-end LSR or by some other entity operating as a path computation element (PCE). The head-end LSR (or a PCE) exploits its knowledge of network topology and resources available on each link to perform the path computation according to the LSP Traffic Engineering constraints. Various path computation methodologies are available including CSPF (constrained shortest path first). MPLS TE LSPs can be configured within a single IGP area or may also span multiple IGP areas or ASes.

The PCE is an entity having the capability to compute paths between any nodes of which the PCE is aware in an AS or area. PCEs are especially useful in that they are more cognizant of network traffic and path selection within their AS or area, and thus may be used for more optimal path computation. A head-end LSR may further operate as a path computation client (PCC) configured to send a path computation request to the PCE, and receive a response with the computed path, potentially taking into consideration other requests from other PCCs. It is important to note that when one PCE sends a request to another PCE, it acts as a PCC. PCEs conventionally have limited or no visibility outside of its surrounding area or AS. A PCC can be informed of a PCE either by pre-configuration by an administrator, or by a PCE Discovery (PCED) message ("advertisement"), which is sent from the PCE within its area or across the entire AS to advertise its services.

One difficulty that arises in crossing AS boundaries is that path computation at the head-end LSR requires knowledge of network topology and resources across the entire network between the head-end and the tail-end LSRs. Yet service providers typically do not share this information with each other across AS borders. Neither the head-end LSR nor any single PCE will have sufficient knowledge to compute a path. Because of this, MPLS Traffic Engineering path computation techniques are required to compute inter-domain TE LSPs. A similar problem arises in computing the paths of MPLS Traffic Engineering LSPs across areas. Network topology and resource information do not generally flow across area boundaries even though a single service provider may operate all the areas.

The use of PCEs has been adapted to create a distributed PCE architecture, in order to extend MPLS TE LSPs across AS or area boundaries. An example of such a distributed architecture is described in commonly-owned copending U.S. patent application Ser. No. 10/767,574, entitled COMPUTING INTER-AUTONOMOUS SYSTEM MPLS TRAFFIC ENGINEERING LSP PATHS, filed by Vasseur et al., on Sep. 18, 2003, the contents of which are hereby incorporated by reference in its entirety. In a distributed PCE architecture, the visibility needed to compute paths is extended between adjacent areas and ASes so that PCEs may cooperate to compute paths across multiple areas or ASes by exchanging virtual shortest path trees (VSPTs) while preserving confidentiality across ASes. VSPTs, which may be represented as virtual links made of "loose hops," are used because service providers may desire to maintain their internal network architectures and designs confidential. One way to compute the VSPTs is by using a virtual shortest path tree (VSPT) algorithm. Generally, a VSPT is a compressed path description (entry and exit/destination points of areas/ASes) that informs a previous PCE that a destination can be reached from a particular entry to a particular exit in such a way that the internal path specifics are kept confidential from an adjacent area or AS. The virtual links that compose the VSPT will generally have an associated network cost for each calculated link. It should be noted that in the context of multiple ASes operating under a common authority (e.g. a unique service provider), such virtual links may also specify an entire path. A set of virtual links may be further organized (in certain protocols) within an explicit route object (ERO) to facilitate transfer of the compressed path descriptions to the previous PCE.

Some applications may incorporate unidirectional data flows configured to transfer time-sensitive traffic from a source (sender) in a computer network to a destination (receiver) in the network in accordance with a certain "quality of service" (QoS). Here, network resources may be reserved for the unidirectional flow to ensure that the QoS associated with the data flow is maintained. The Resource Reservation Protocol (RSVP) is a network-control protocol that enables applications to reserve resources in order to obtain special QoS for their data flows. RSVP works in conjunction with routing protocols to, e.g., reserve resources for a data flow in a computer network in order to establish a level of QoS required by the data flow. RSVP is defined in R. Braden, et al., *Resource ReSerVation Protocol (RSVP)*, RFC 2205. In the case of traffic engineering applications, RSVP signaling is used to convey various TE LSP attributes, e.g., an ERO, to routers, such as border routers, along the TE LSP obeying the set of required constraints.

Because an inter-area or inter-AS TE LSP may have been computed by means of a cooperative set of PCEs, the computed path may be known by the head-end LSR as a set of loose hops. Consequently, such paths would be signaled by the head-end LSR using an ERO made of loose hops. However, when using loose hops in the ERO, the computed path from a PCE within an area or AS may or may not be the actual path used because the traversed loose hop may not have the knowledge of this computed path and thus may compute a different path than the path previously computed by the PCE. Indeed, because a loose hop only signifies the entry and exit of an area or AS, a border router (the entry) receiving the loose hop must generally recompute a path segment to the exit in accordance with conventional ERO expansion techniques and using its own knowledge of the network. Even in the case where the entry is the PCE that originally computed the path, PCE is generally stateless, meaning once it computes the path segment and sends the response to a PCC, the path is no longer stored in memory, so it, too, must recompute the path. Such re-computation consumes resources of the border router, and may in some cases not provide the promised path cost (e.g., when the border router computes a different path segment to reach the exit). In addition, re-computation of paths introduces delays or latencies that may adversely impact time sensitive traffic engineering applications, such as TE LSP set up times.

Diverse paths between nodes, e.g., a source and destination, in the network offer a variety of benefits including redundancy, in the case of a node or link failure (because a single failure may not simultaneously impact diverse paths), and load balancing of traffic while trying to limit the impact of a failure on some part of the traffic. Therefore, a PCE may often be requested to compute diverse paths; however, in response to such a request, there is no guarantee that the re-computed paths will remain diverse. For example, if two entry border routers of an area receive a path reservation request with loose hops to exits, independently they will be unaware of each other, and unaware of the diversity requirement. Because of this, when recomputing the path segments, both border routers may utilize the same internal network devices along the way to the different exit border routers of the loose hops, thereby losing the requested diversity.

There remains a need, therefore, for a system and method to retrieve specific internal-area or internal-AS paths that have been computed by a PCE.

SUMMARY OF THE INVENTION

The present invention is directed to a technique for retrieving computed path segments across one or more domains of a computer network in accordance with a stateless Path Computation Element (PCE) model. The stateless PCE model includes one or more PCEs configured to compute one or more path segments through the domains in response to a path computation request issued by, e.g., a Path Computation Client (PCC). Notably, each computed path segment is encrypted as a data structure to preserve confidentiality across the domains. Each PCE then cooperates to return a path computation response, including the encrypted path segments and a computed path containing compressed path descriptions of the computed path segments, to the PCC.

In the illustrative embodiment, the computed path segment is encrypted as a novel private route object (PRO) data structure embodying a type/length/value (TLV) encoding format. A value field of the TLV format holds the encrypted path segment containing encrypted path descriptions of the segment. Illustratively, the computed path segment is encrypted in accordance with an algorithm specific to the domain of the PCE. That is, each PCE may employ an encryption algorithm specific to its domain, so that if a requested path spans several domains, each computed path segment may be encrypted with a different algorithm.

Upon receiving the response, the PCC generates a path reservation message for transmission to certain receiving nodes, such as border routers, along the path described by the ERO. The path reservation message is illustratively a Resource ReSerVation Protocol (RSVP) path message that includes both the ERO and the novel PRO. Each border router of a domain that receives the path reservation message searches for the PRO. In response to locating that object, the router extracts the encrypted path segment and, according to an aspect of the invention, is configured to decrypt it using keys associated with the specific encryption algorithm of the domain.

Advantageously, the technique described herein enables efficient computation of paths, such as inter-domain traffic engineering (TE) label switched paths (LSPs) and/or diverse paths, across multiple domains of a network. In particular, the inventive technique obviates the need to perform one or more additional path computations specified by compressed path descriptions of an ERO with respect to intra-domain segments previously computed by one or more PCEs. The invention further provides an optimal set of (shortest) path segments, while preserving confidentiality across the multiple domains, and allows for the preservation of computed path diversity.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1A:
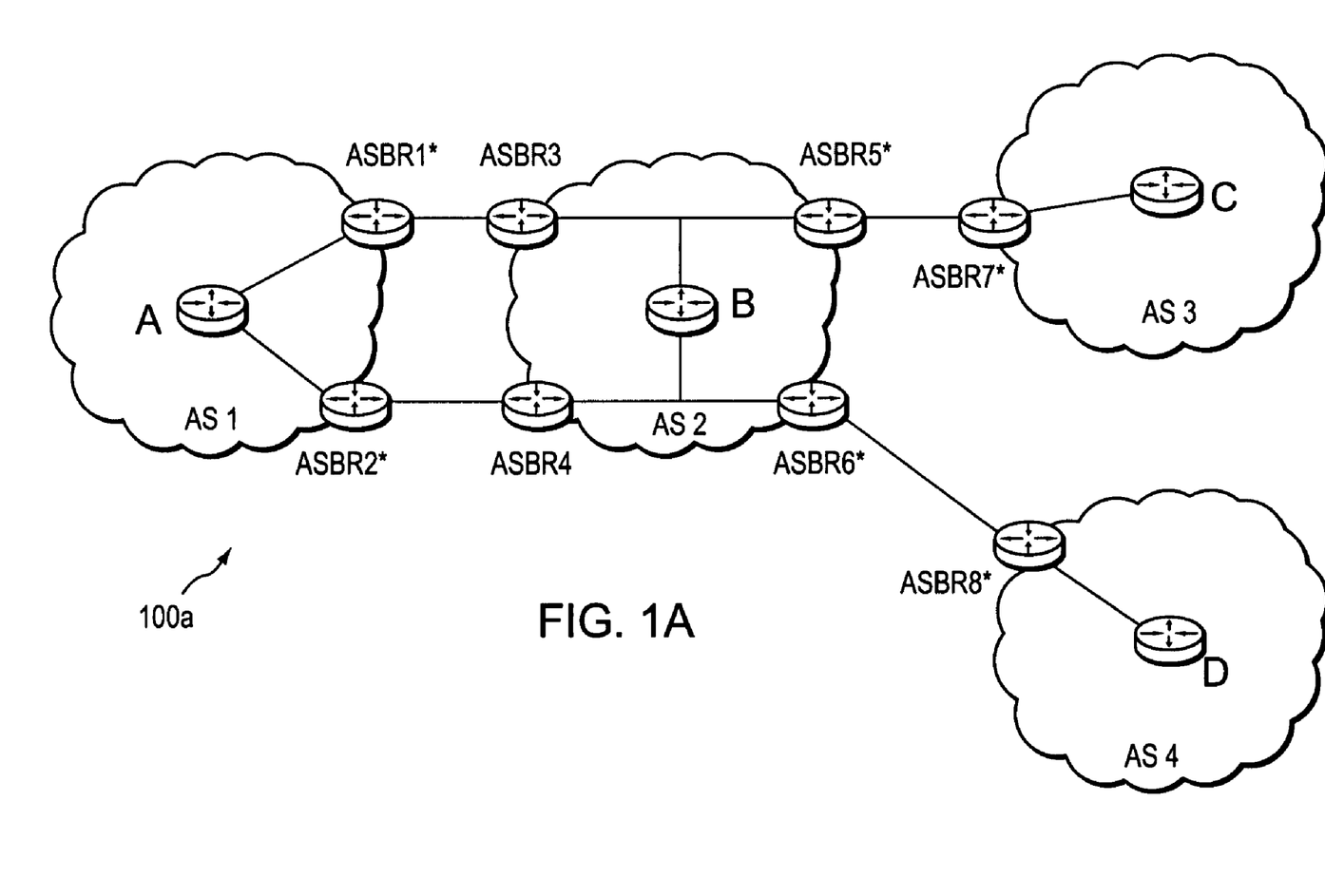
FIG. 1A is a schematic block diagram of an exemplary computer network of autonomous systems that may be used in accordance with the present invention.

FIG. 1A is a schematic block diagram of an exemplary computer network 100a comprising autonomous system AS2, which is interconnected with a plurality of other autonomous systems AS1, AS3, and AS4. An Autonomous System (AS) is herein defined to be a group of intermediate nodes, such as intradomain routers, within a network that are subject to a common authority and execute one or more intradomain routing protocols. Although, each AS is illustratively an autonomous system, those skilled in the art will appreciate that the ASes may alternatively be configured as routing domains or other networks or subnetworks. The autonomous system AS1 includes intradomain routers such as border routers ASBR1* and ASBR2* through which communication, such as data packets, may pass into and out of the autonomous system to border routers ASBR3 and ASBR4, respectively of AS2. AS2 also includes border routers ASBR5* and ASBR6* in communication with border routers ASBR7* and ASBR8* of ASes 3 and 4, respectively. Moreover, within AS1, AS2, AS3, and AS4, there are exemplary intradomain routers A, B, C, and D, respectively. Those skilled in the art will understand that any number of routers may be used in the ASes, and that the view shown herein is for simplicity.

Data packets may be exchanged among the autonomous systems AS1-AS4 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing information may be distributed among the routers within an AS using predetermined "interior" gateway protocols (IGPs), such as conventional distance-vector protocols or, illustratively, link-state protocols, through the use of link-state advertisements (LSAs) or link-state packets. In addition, data packets containing network routing information may be exchanged among the autonomous systems AS1-AS4 using "external" gateway protocols, such as the Border Gateway Protocol (BGP).

Figure 1B:
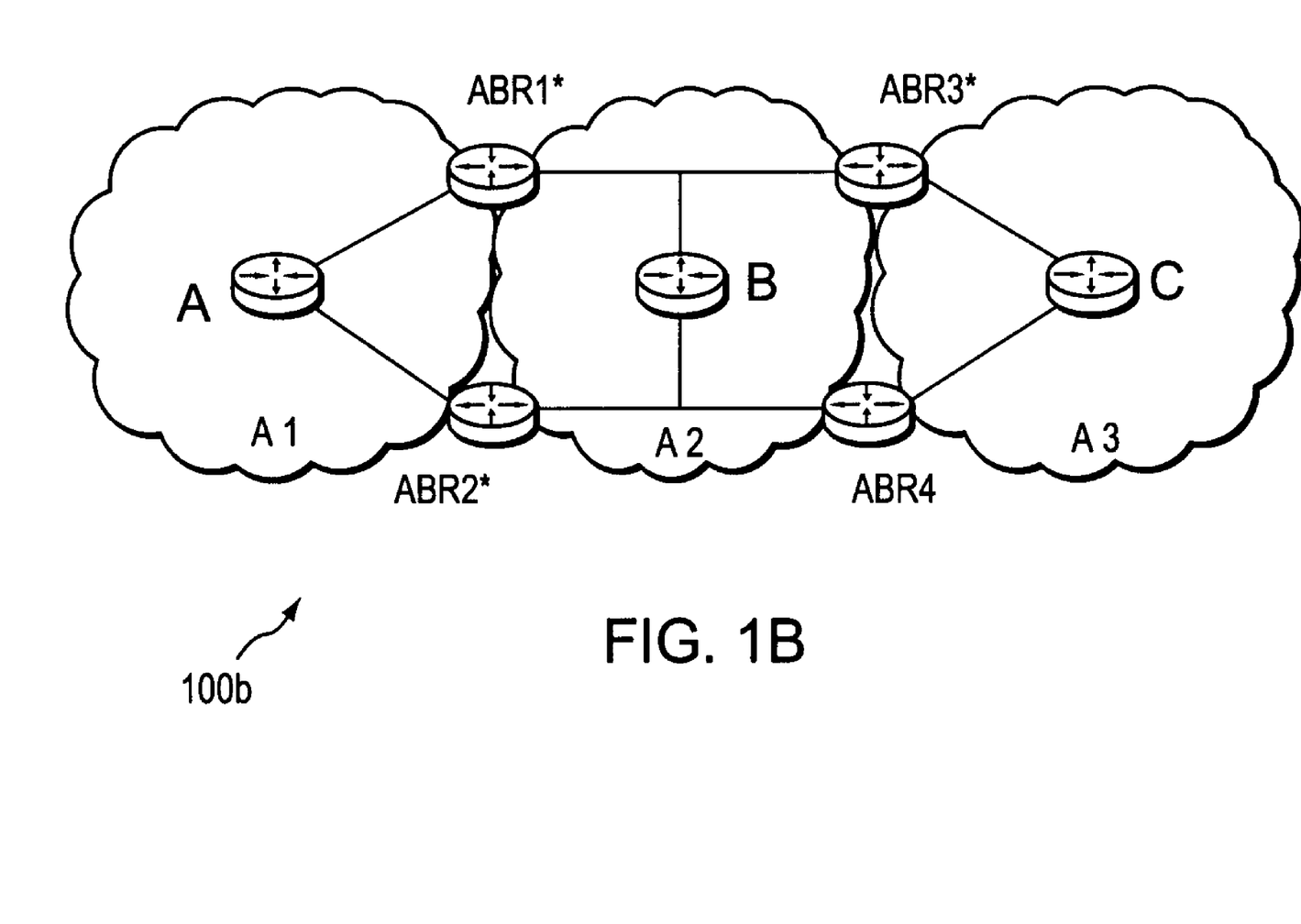
FIG. 1B is a schematic block diagram of an exemplary computer network of areas that may be used in accordance with the present invention.

FIG. 1B is a schematic block diagram of an exemplary computer network 100b comprising areas A1, A2, and A3, each having at least one intradomain router, A, B, and C, respectively. In addition, A1 and A2 share border routers ABR1* and ABR2*, while A2 and A3 share ABR3* and ABR4. As used herein, area is a collection of routers that share full network topology information with each other but not necessarily with routers outside the area. The term area as used herein also encompasses the term "level" which has a similar meaning for networks that employ IS-IS as their IGP. These examples are merely representative. Furthermore, the techniques described below with reference to inter-AS path computation may be used in the context of inter-area path computation and, under certain conditions, the techniques described with reference to inter-area path computation may be used for inter-AS path computation. It will be understood by those skilled in the art that wherever autonomous systems are referred to, areas may be used also.

Figure 2:
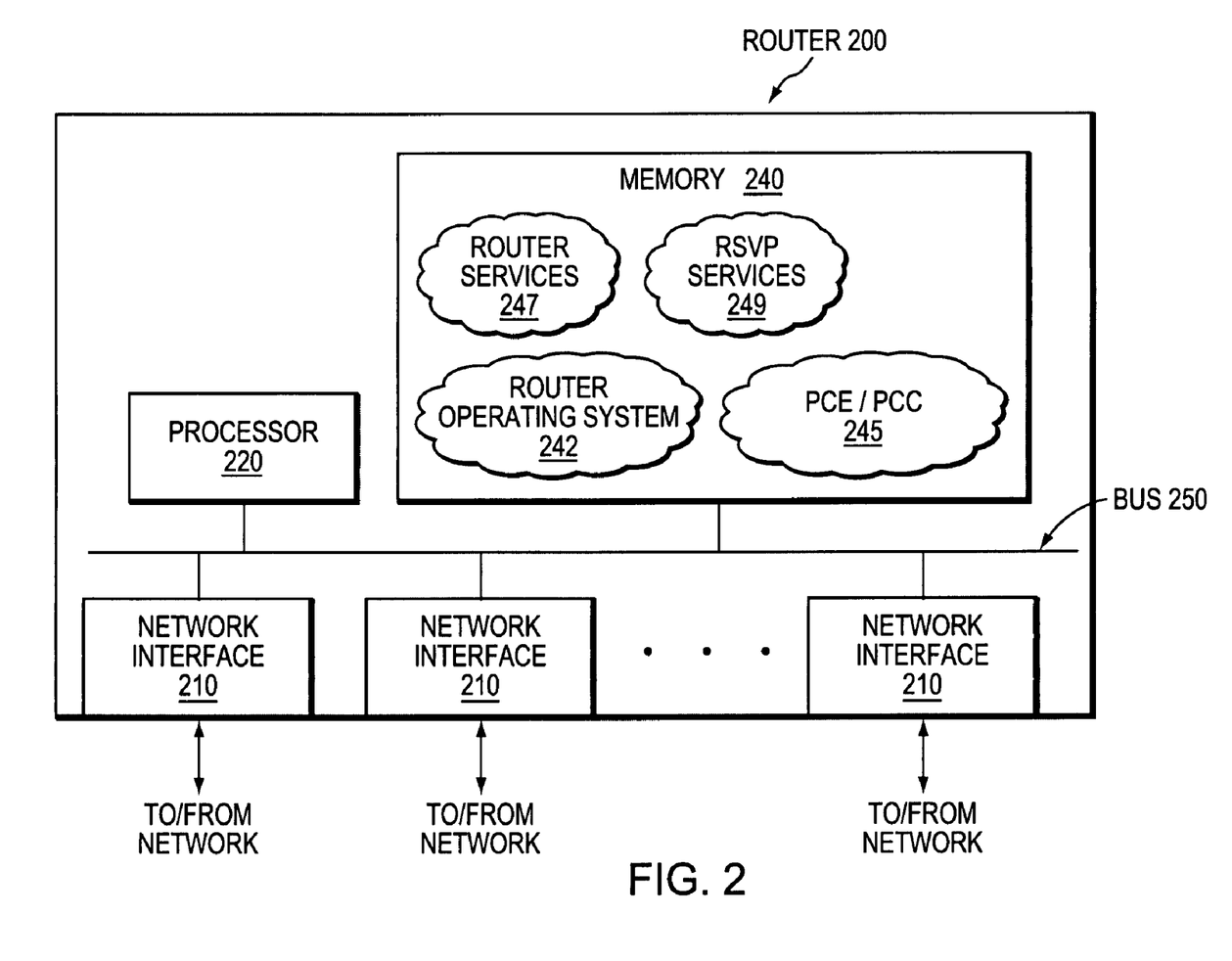
FIG. 2 is schematic block diagram of an exemplary router that may be advantageously used with the present invention.

FIG. 2 is a schematic block diagram of an exemplary router 200 that may be advantageously used with the present invention as an intradomain router or a border router. The router comprises a plurality of network interfaces 210, a processor 220, and a memory 240 interconnected by a system bus 250. The network interfaces 210 contain the mechanical, electrical and signaling circuitry for communicating data over physical links coupled to the network 100a,b. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures. A router operating system 242, portions of which are typically resident in memory 240 and executed by the processor, functionally organizes the router by, inter alia, invoking network operations in support of software processes and/or services, such as PCC/PCE process 245, routing services 247, and RSVP services 249 executing on the router. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF and IS-IS. These functions may be configured to manage a forwarding information database (not shown) containing, e.g., data used to make forwarding decisions. RSVP services 249 contain computer executable instructions for implementing RSVP and processing RSVP messages in accordance with the present invention. RSVP is described in R. Braden, et al., *Resource ReSerVation Protocol (RSVP)*, Request For Comments (RFC) 2205, September 1997, available from the IETF and which is hereby incorporated by reference as though fully set forth herein, and in RFC 3209, entitled *RSVP-TE: Extensions to RSVP for LSP Tunnels*, as incorporated above.

In one embodiment, the routers described herein are IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop.

The paths taken by packets that traverse the network in this manner are referred to as label switched paths (LSPs). Establishment of an LSP requires computation of a path, signaling along the path, and modification of forwarding tables along the path. MPLS Traffic Engineering establishes LSPs that have guaranteed bandwidth under certain conditions. Illustratively, the TE LSPs may be signaled through the use of the RSVP protocol.

Figure 3:
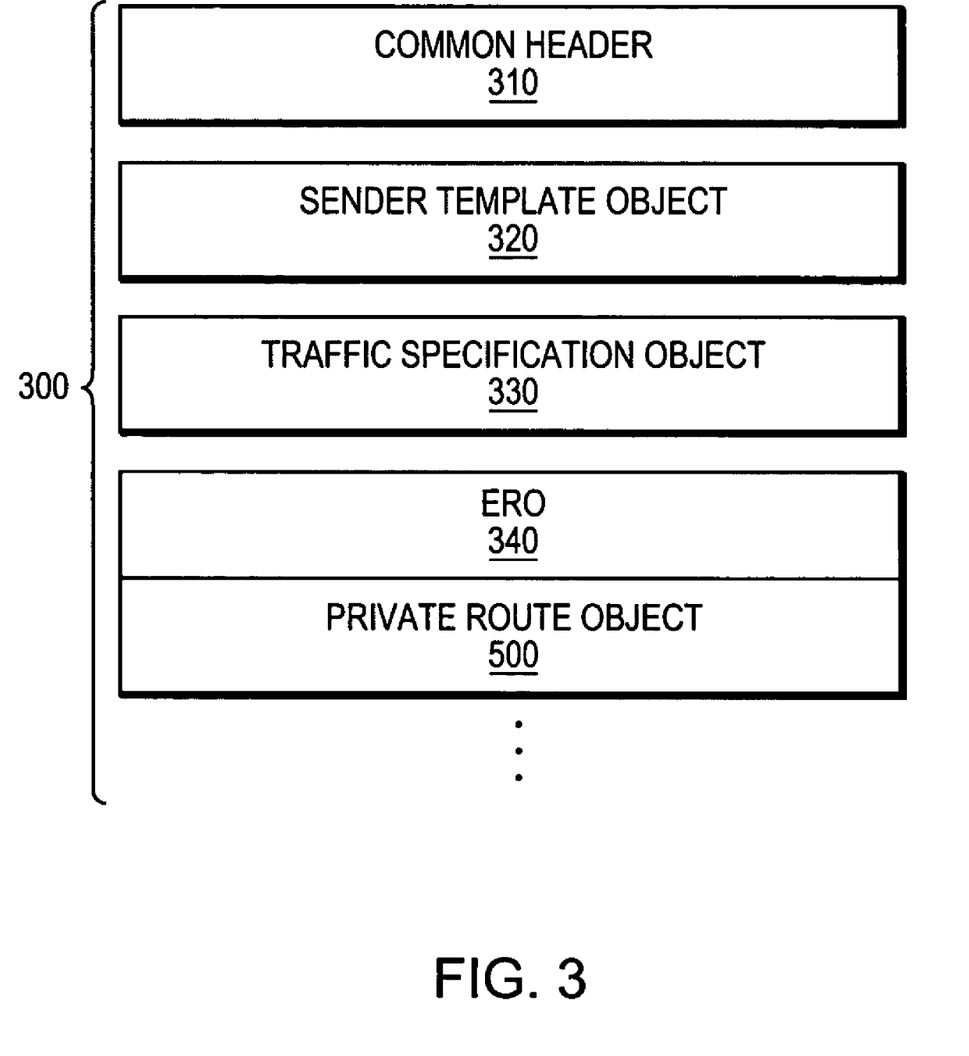
FIG. 3 is a schematic block diagram of portions of an RSVP Path message 300 that may be advantageously used with the present invention.

In accordance with RSVP, to establish a data flow between a sender and a receiver, the sender may send an RSVP path (Path) message downstream hop-by-hop along a path (e.g., a unicast route) to the receiver to identify the sender and indicate e.g., bandwidth needed to accommodate the data flow, along with other attributes of the TE LSP. The Path message may contain various information about the data flow including, e.g., traffic characteristics of the data flow. FIG. 3 is a schematic block diagram of portions of an RSVP Path message 300 that may be advantageously used with the present invention. Message 300 contains, inter alia, a common header 310, a sender template object 320, a traffic specification (Tspec) object 330 and an explicit route object (ERO) 340. It should be noted that message 300 may contain other objects including a novel Private Route object 500 (described further below).

Although the illustrative embodiment described herein is directed to MPLS, it should be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

To compute paths across multiple areas or ASes, above-referenced U.S. application Ser. No. 10/767,574 describes the use of a virtual shortest path tree (VSPT) algorithm in a distributed path computation element (PCE) architecture, which has been incorporated by reference herein. According to the VSPT algorithm, for an inter-AS path computation example such as in FIG. 1A, a PCC (Router A) first sends a path computation request to a known local PCE in its AS, such as ASBR1*, to compute a path to a destination (e.g., a tail-end LSR) such as Router C in AS3. As an example, border routers marked with '*' in FIGS. 1A and 1B are PCE enabled border routers. The address of the local PCE may be manually configured. Alternatively, the PCE may advertise itself through flooding within the AS. Path computation element discovery (PCED) techniques can be used in accordance with *OSPF MPLS Traffic Engineering Capabilities (draft-vasseur-ospf-te-caps.txt)* by Vasseur, et al., published July 2004, which is hereby incorporated by reference. A PCED message may include indications of PCE capabilities, such as the ability to compute local paths, inter-area paths, inter-AS paths, multi-domain paths, diverse paths, etc.

The path computation request (and response) can be made in accordance with a protocol specified in Vasseur, et al. *RSVP Path Computation Request and Reply Messages*, Internet Draft, July 2004, which is hereby incorporated by reference as though fully set forth herein. The path computation request is then passed to a PCE in every AS (AS1, AS2, AS3) on the way to the destination. Knowledge of the other PCE addresses may be acquired by way of static configuration or BGP advertisements, as could be readily devised by one of skill in the art. It should be understood that the use of RSVP serves only as an example, and that other communication protocols may be used in accordance with the present invention.

Once reached by the path computation request, the PCE (ASBR7*) in the final AS (AS3) containing the destination (Router C) computes a VSPT, which is a shortest path tree rooted at the destination and includes the set of shortest path(s) satisfying a set of required constraints from this destination to every border router of the area. This may be computed using a CSPF (constrained shortest path first) algorithm as known in the art or any other suitable algorithm. The PCE of the final area then sends the VSPT to the previous AS's (AS2) PCE (ASBR5*) with a virtual link (or a "loose hop"). The VSPT optionally uses the loose hop in such a way that hops internal to an AS and their costs remain confidential. A loose hop may have a single associated cost that is a combination or representation of internal costs. If multiple equal-cost paths are found, a PCE may provide some or all of them to the requesting PCC. Other situations where a PCE may return more than one path include, e.g., where the PCC requests the computation of diverse paths. These diverse paths may or may not have equal costs.

The PCE (ASBR5*) in the previous AS now repeats the VSPT algorithm, and concatenates the VSPT it received from the final PCE (ASBR7*) with the topology of its own AS (AS2) (including the inter-AS links) to compute new paths. This process repeats through all ASes until the response reaches the originating PCC (Router A). For this reason the VSPT algorithm is referred to as a "recursive backward path computation."

When the above described procedure completes at the originating PCC, the path in the response consists of a series of hops to the destination along the path. Notably, hops may be loose wherever the network is to be kept confidential. In this case, the complete computed path can be thought of as a basic path through the ASes that consists only of the entry and exit points of each confidential AS. The following is an example of the contents of such a computed path, also known as an ERO (such as ERO 340): "ASBR1*, ASBR3, ASBR5* (L), ASBR7*, Router C (L)," where "(L)" denotes a loose hop. The PCC can then establish a tunnel (e.g. LSP) to the destination by forwarding a RSVP Path message 300 over the computed path (in the ERO) to the exit border router of its area or AS. It should be understood that in an area architecture, the exit border router is the entry border router for the next area. This next border router then computes the specific path to the next exit border as specified by the next loose hop in the ERO 340. That exit border router thereafter repeats the procedure according to the ERO, and so on, until the destination is again reached, and a tunnel is created according to methods known in the art.

Figure 4:
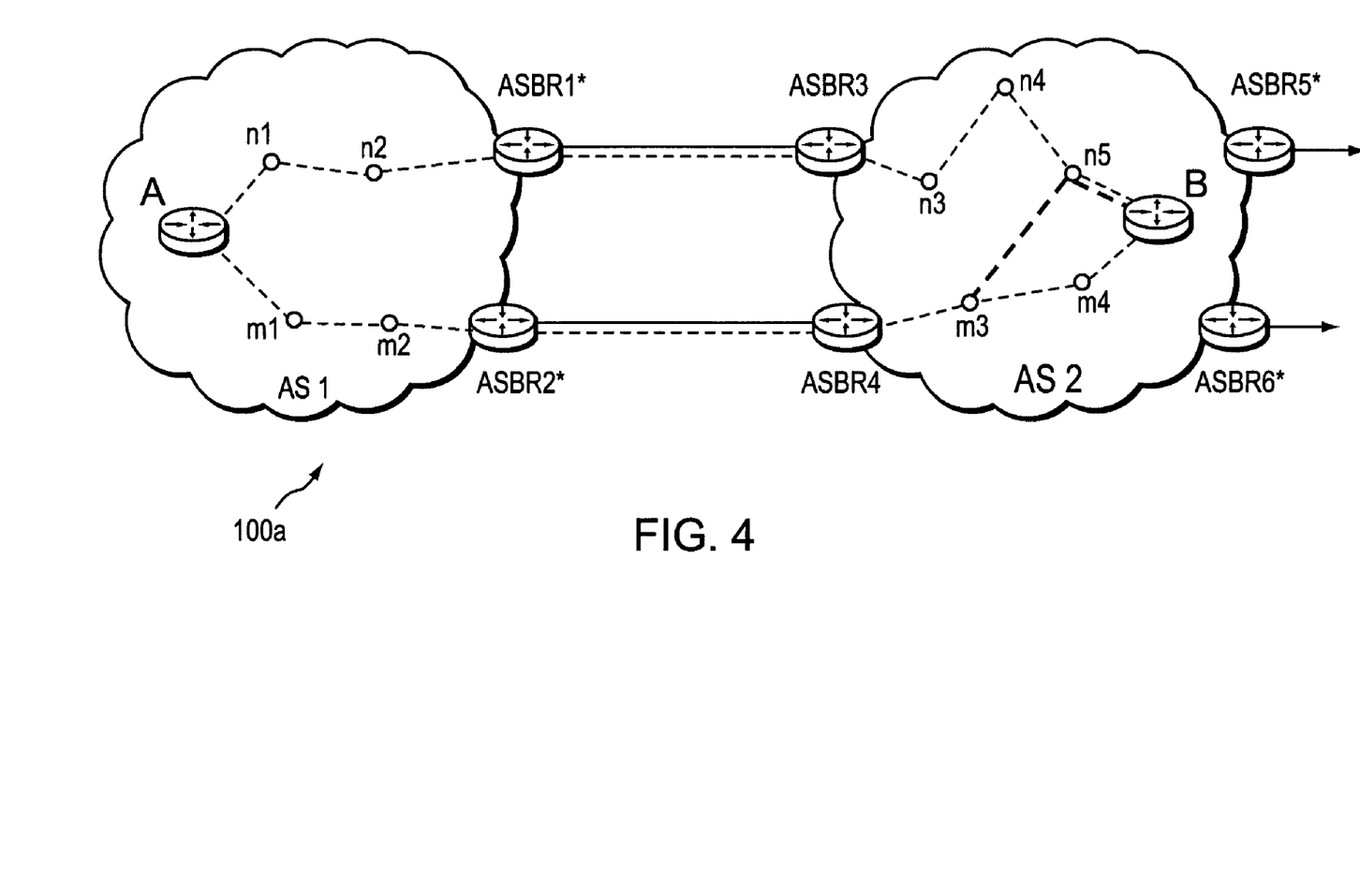
FIG. 4 is a detailed schematic block diagram of the computer network of FIG. 1A that may be advantageously used with the present invention.

FIG. 4 is a more detailed schematic block diagram of AS1 and AS2 of network 100a, showing two diverse paths (dotted lines) between Router A and Router B that have been calculated according to the method described above. Typically, this arises when a PCC (Router A) requests a path computation that results in any number of diverse paths between it and a destination (Router B). Diverse paths are known to those skilled in the art, and offer a variety of benefits. One such benefit is redundancy of paths to a destination, so that should a node or link fail in some way, a backup path has already been established, and traffic can substantially immediately be transferred to that path. Another benefit is for load balancing the traffic that is to flow along the path. For example, a PCC with a 10 MB/sec flow of data may wish to distribute 5 MB/sec along one path, and 5 MB/sec along the other. This may limit the amount of data lost, and/or the amount of traffic to redirect, should any node or link along one of the paths fail. Other benefits of path diversity should be understood by those skilled in the art. In addition to its knowledge of the networks, a PCE can compute diverse paths because it is aware of all the paths it is computing while it computes them, so it can be sure not to use conflicting nodes or links. It is important to note that a PCC may wish to compute paths that are link diverse (share no common links), node diverse (share no common node), or Shared Risk Link Group (SRLG) diverse (share no common SRLG).

In FIG. 4, two example paths between Router A and Router B are to be established in accordance with the methods described herein. The first path begins in AS1, and will continue through nodes n1 and n2 to ASBR1*. From ASBR1*, the path travels to AS2 by continuing to ASBR3, and continues to the destination, Router B, by first passing though nodes n3, n4, and n5. A second path between Router A and Router B begins again at Router A, but has been calculated to reach a different border router, ASBR2*, through nodes m1 and m2. From ASBR2*, the path continues to AS2 through ASBR4, and then on to Router B through nodes m3 and m4. It should be noted that the dashed line from m3 to n5 to B is an example of a path possibly recomputed by ASBR4 in accordance with the methods of the prior art, given a loose hop to destination Router B. It can be seen in this case that the newly computed path is neither node diverse nor link diverse.

The present invention is directed to a technique for retrieving computed path segments across one or more domains of a computer network in accordance with a stateless Path Computation Element (PCE) model. The stateless PCE model includes one or more PCEs configured to compute one or more path segments through the domains in response to a path computation request issued by, e.g., a Path Computation Client (PCC). Notably, each computed path segment is encrypted as a data structure to preserve confidentiality across the domains. Each PCE then cooperates to return a path computation response, including the encrypted path segments and a computed path containing compressed path descriptions of the computed path segments, to the PCC.

Figure 5:
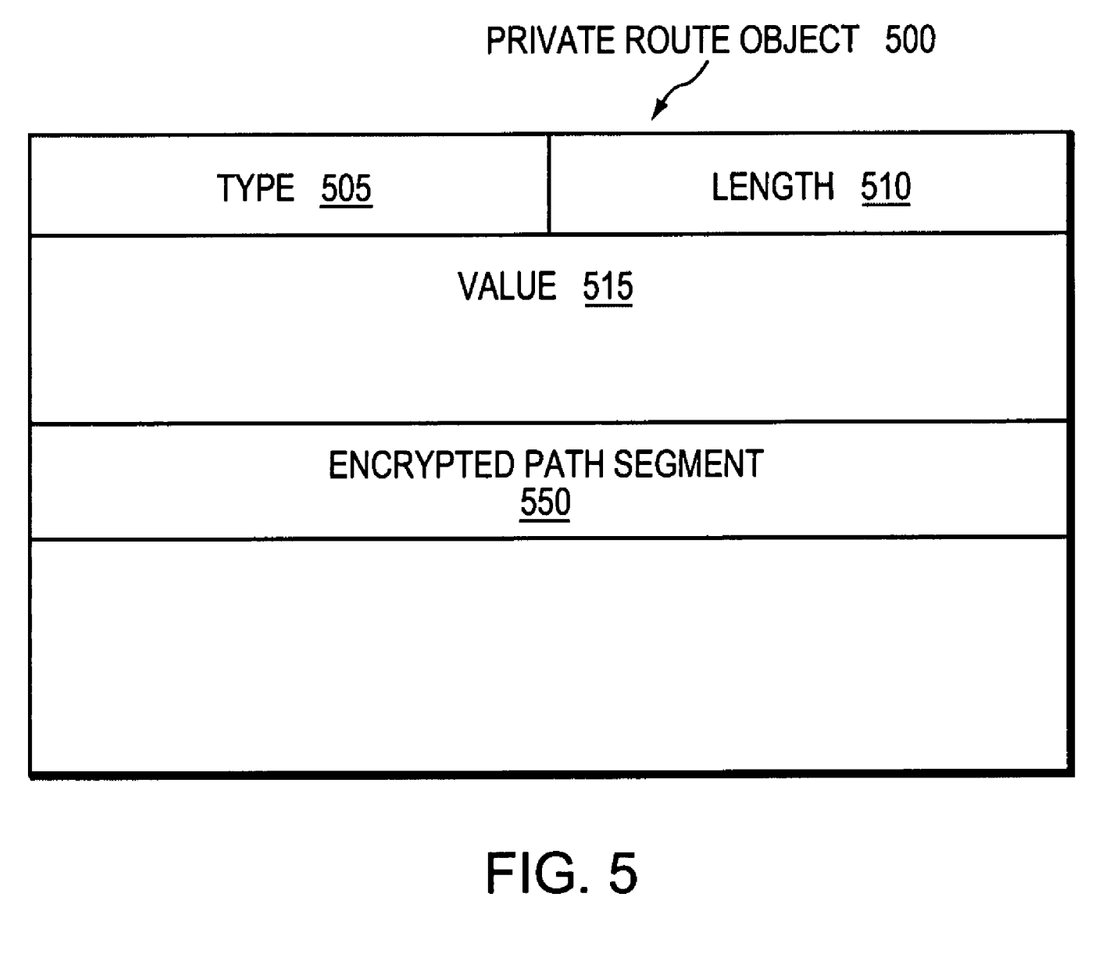
FIG. 5 is a schematic block diagram of illustrating the format of a private route object that may be advantageously used with the present invention.

In the illustrative embodiment, the computed path segment is encrypted as a novel private route object (PRO) data structure embodying a type/length/value (TLV) encoding format. FIG. 5 is a schematic block diagram illustrating the format of the PRO object 500. The TLV object 500 is used to identify a type (T) of information being communicated (conveyed), a length (L) of information to be conveyed and a value (V) of the actual information conveyed. The length (L) parameter contained in the length field 510 is typically implementation-specific and can denote the length from the beginning of the Type field 505 of the object 500 to the end. However, the length generally denotes the length of the Value (V) field 515 and not the Type (T) or Length (L) fields. The value field 515 contains one or more encrypted path segments 550 containing encrypted path descriptions of the segments. Illustratively, the computed path segment is encrypted in accordance with an algorithm specific to the domain of the PCE. That is, each PCE may employ an encryption algorithm and/or key specific to its domain, so that if a requested path spans several domains, each computed path segment may be encrypted with a different algorithm and/or key. In an alternative embodiment of the present invention, the PRO and/or encrypted path segment may be inserted within the structure of the ERO, or a placeholder may be used within the ERO for referencing the PRO 500.

The encrypted path segment 550, also known as an encrypted ERO, may be created using conventional encryption means, such as private key encryption. Examples of encryption algorithms that may be advantageously used with the present invention are described in the Federal Information Processing Standards Publication 46-2, entitled *Data Encryption Standard (DES)*, published Dec. 30, 1993, and U.S. Pat. No. 6,804,355, entitled *Block Cipher for Small Selectable Block Sizes*, by Graunke, issued Oct. 12, 2004, both of which are herein incorporated in their entirety. Those skilled in the art will understand that other means of encryption are available to be used in accordance with the scope of the present invention.

Moreover, the encryption method employed by a PCE of a particular domain may be configured in any variety of ways. For example, in addition to using a single encryption method and key for an entire AS or area, a PCE may use an encryption method and key for specific groups of routers (e.g., border routers of an AS connected to a first AS may use a different key or method from border routers connected to a second AS). Notably, this method allows encryption to be disabled (or keys to be made available to a third-party) for the purposes of monitoring, debugging, or for router validation, without the confidential information of the ASes being made available to other customers. Another encryption configuration involves use of an encryption method and/or key specific to each entry border router. It should be understood that these methods are to be taken as examples only, and that other methods for configuring encryption may be available by means known to those skilled in the art, and such methods are within the scope and protection of the present invention.

Upon receiving the path computation response, the PCC generates a path reservation message for transmission to certain receiving nodes, such as border routers, along the path described by the ERO. The path reservation message is illustratively a RSVP Path message 300 that includes both the ERO 340 and the novel private route object 500, as described above. Each border router of a domain that receives the path reservation message 300 searches for the PRO 500. In response to locating that object, the router extracts the encrypted path segment 550, and, according to an aspect of the invention, is configured to decrypt it using keys associated with the specific encryption algorithm of the domain, as described above.

Figure 6:
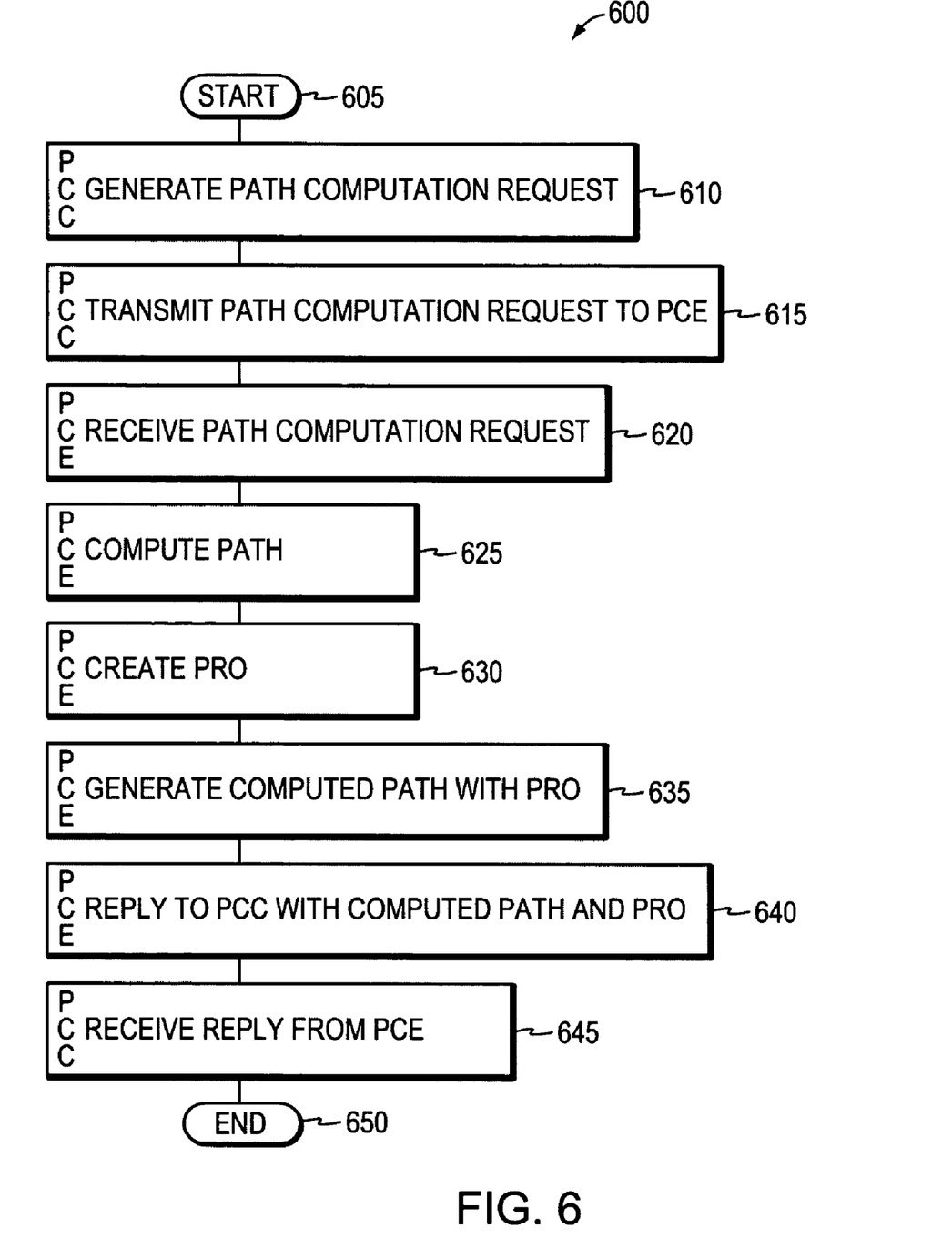
FIG. 6 is a flowchart illustrating a sequence of steps for establishing a computed path for a tunnel (or tunnels) in accordance with the present invention.

FIG. 6 is a flowchart illustrating a sequence of steps for establishing a computed path for a tunnel (or tunnels) in accordance with the present invention. The sequence starts at step 605, and continues to step 610, where a PCC generates a path computation request. Typically, the path computation request comprises a source PCC address and a desired tunnel destination address. Once generated, in step 615 the PCC transmits this request to a PCE to compute a path segment ("path"). In the event that there are multiple PCEs visible to the PCC, the PCC chooses the best PCE according to desired metrics. Methods of this determination are fully described in commonly-owned co-pending U.S. application Ser. No. 10/983,280 entitled SYSTEM AND METHOD FOR SELECTING A PATH COMPUTATION ELEMENT, filed by Vasseur et al. on even date herewith, the contents of which are hereby incorporated in its entirety.

A PCE, such as ASBR5* in FIG. 4, for example, receives the path computation request in step 620, and begins computing an optimal path or paths for the desired destination in step 625 as described above. Once the path or paths have been computed, the PCE creates a PRO for the computed path in step 630. In step 635, the PCE also generates a computed path containing compressed path descriptions of the computed path in the PRO (as described above) and, in step 640, returns a path computation response (reply) that includes the PRO and computed path, to the PCC. The PCC receives the reply in step 645 and the sequence ends at step 650.

Figure 7:
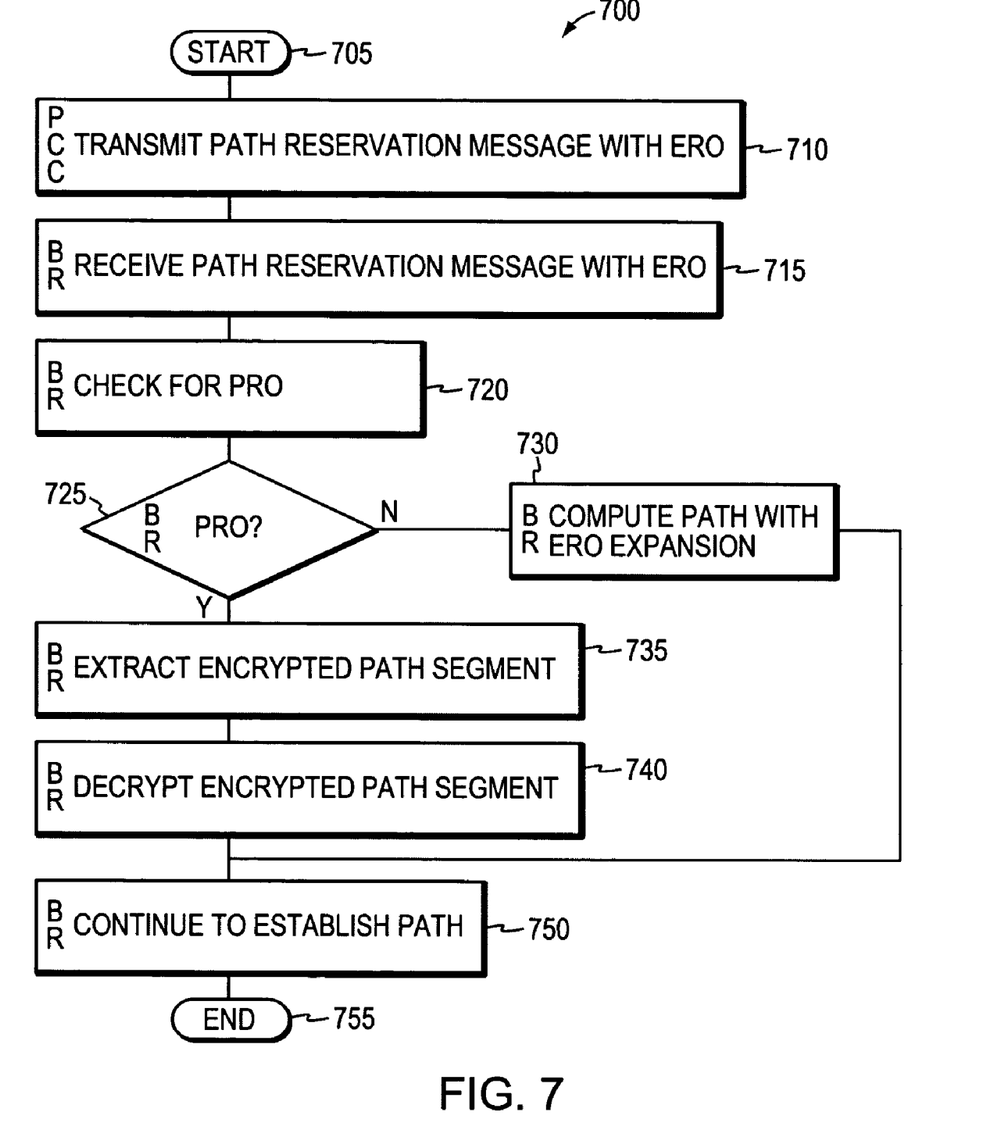
FIG. 7 is a flowchart illustrating a sequence of steps for establishing a path (tunnel) to a destination using computed paths according to the invention.

FIG. 7 is a flowchart illustrating a sequence of steps for establishing a path (tunnel) to a destination using computed paths according to the invention. The sequence starts at 705 and proceeds to step 710 where the PCC transmits a generated path reservation message 300 with ERO 340 and PRO 500 over the path described by the ERO (e.g., n1, n2, ASBR1*, ASBR3 . . . ) to certain receiving nodes, such as border routers. Upon receiving the message in step 715 (e.g., . . . , ASBR3, B(L), . . . ), a border router of an AS or area, such as ASBR3 in FIG. 4, calculates a path to the destination (B). In accordance with the present invention, in step 720 the border router checks for the presence of the PRO in the message. If, in step 725, it is determined that there is no PRO, the border router computes a path segment for a loose hop described in the ERO using a conventional ERO expansion technique in step 730. If, however, there is a PRO in the message, the border router then extracts the encrypted path segment in step 735. In step 740, the router decrypts the encrypted path segment using an encryption method and key associated with its domain (AS or area).

Once the encrypted path segment is decrypted, the border router can continue to establish the tunnel between the source router (router A) and the destination (router B) in accordance with standard tunneling procedures (step 750). Notably, decryption of the encrypted path segment 550 provides the border router with the original computed path segment and, thus, obviates the need for a second path computation, while potentially preserving diverse path establishment. The sequence then ends in step 755. Those skilled in the art should understand that the above sequence may expand when spanning even more areas or ASes.

Advantageously, the technique described herein enables efficient computation of paths, such as inter-domain traffic engineering (TE) label switched paths (LSPs) and/or diverse paths, across multiple domains of a network. In particular, the inventive technique obviates the need to perform one or more additional path computations specified by encrypted path descriptions of an ERO with respect to intra-domain segments previously computed by one or more PCEs. The invention further provides an optimal set of (shortest) path segments, while preserving confidentiality across the multiple domains, and allows for the preservation of computed path diversity.

While there has been shown and described an illustrative embodiment that retrieves computed path segments across one or more domains of a computer network in accordance with a stateless path computation element (PCE) model, it is to be understood that various other adaptations and modifications may be made within the spirit and scope of the present invention. For example, the invention may also be advantageously used with nested, or hierarchical areas or ASes. Illustratively, an AS may comprise multiple areas utilizing PCE-based path computation to compute inter-AS as well as inter-area TE LSPs. In this case, upon receiving a request from a neighboring AS, the AS border router acting as a PCE may return a set of compressed paths (specifying border routers within each area) along with their associated encrypted path segments. Alternatively, the PCE may also provide a single aggregated compressed path with a single encrypted path segment, which would locally translate in a succession of compressed paths with their associated encrypted path segments.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for retrieving computed path segments across one or more domains of a computer network in accordance with a stateless path computation element (PCE) model, the method comprising the steps of:

receiving a path reservation message at a node, the path reservation message including one or more private route objects (PROs), wherein each PRO is associated with a different domain;

scanning the path reservation message to find a PRO associated with a same domain as the node;

extracting, in response to finding the PRO, an encrypted path segment; and decrypting a computed path segment from the encrypted path segment.

2. The method of claim 1, further comprising: using the computed path segment to complete a path reservation request.

3. The method of claim 1, further comprising: in response to finding no PRO associated with the same domain as the node, computing a path segment for a loose hop described in an explicit route object (ERO) using ERO expansion.

4. A system configured to retrieve computed path segments across one or more domains of a computer network in accordance with a stateless path computation element (PCE) model, the system comprising:

a network interface to receive a path reservation message, the path reservation message including one or more private route objects (PROs), wherein each PRO of the one or more PROs is associated with a different domain; and a processor to i) scan the path reservation message to find a PRO associated with a same domain as the system, ii) extract, in response to finding the PRO, an encrypted path segment, and iii) decrypt a computed path segment from the encrypted path segment.

5. The system of claim 4, further comprising: the processor to compute a path segment for a loose hop described in an explicit route object (ERO) using ERO expansion in the event that the scanning finds no PRO associated with the same domain as the system.

6. The system of claim 4, further comprising: the processor to decrypt the computed path segment from the encrypted path segment of the PRO using a domain specific algorithm.

7. An apparatus adapted to retrieve computed path segments across one or more domains of a computer network in accordance with a stateless path computation element (PCE) model, the apparatus comprising:

means for receiving a path reservation message the path reservation message including one or more private route objects (PROs), wherein each PRO of the one or more PROs is associated with a different domain;

means for scanning the path reservation message to find a PRO associated with a same domain as the apparatus;

means for extracting, in response to finding the PRO, an encrypted path segment; and means for decrypting a computed path segment from the encrypted path segment.

8. The apparatus of claim 7, further comprising: means for, in response to finding no PRO associated with the same domain as the apparatus, computing a path segment for a loose hop described in an explicit route object (ERO) using ERO expansion.

* * * * *